United States Patent [19]
Silverman

[11] 4,063,613
[45] *Dec. 20, 1977

[54] CONTROL MEANS FOR PRESSURE FLUID VIBRATORS FOR GENERATING SEISMIC WAVES IN THE EARTH

[76] Inventor: Daniel Silverman, 5969 S. Birmingham St., Tulsa, Okla. 74105

[*] Notice: The portion of the term of this patent subsequent to Oct. 8, 1991, has been disclaimed.

[21] Appl. No.: 495,383

[22] Filed: Aug. 7, 1974

Related U.S. Application Data

[63] Continuation-in-part of Ser. No. 296,669, Oct. 11, 1972, Pat. No. 3,840,090.

[51] Int. Cl.² .............................................. G01V 1/14
[52] U.S. Cl. .................................... 181/119; 181/114; 340/17 R
[58] Field of Search ............... 181/119, 114, 401, 402; 340/17 R, 15.5 R; 137/38

[56] References Cited

U.S. PATENT DOCUMENTS

| | | | |
|---|---|---|---|
| 3,578,102 | 5/1971 | Ross et al. | 181/119 |
| 3,840,090 | 10/1974 | Silverman | 181/119 |

Primary Examiner—Maynard R. Wilbur
Assistant Examiner—Lawrence Goodwin

[57] ABSTRACT

Improvement in electro-fluid vibrator means used for generating seismic waves in the earth in which the flow of pressurized fluid to the vibrator is controlled in accordance with the resultant holddown pressure on the baseplate in contact with the earth, so that there is always a positive pressure on the baseplate, preventing it from being lifted off the surface of the earth. Force measuring means are provided in the holddown means. So long as this force is large and positive (in the direction to hold the baseplate to the earth) no control is required. When this positive force becomes less than a preselected value, the pressure fluid system is controlled to reduce the maximum pressure of, or rate of flow of, pressure fluid to the vibrator. The force measuring system can conveniently utilize the compliances in the holddown system as the force measuring elements.

12 Claims, 3 Drawing Figures

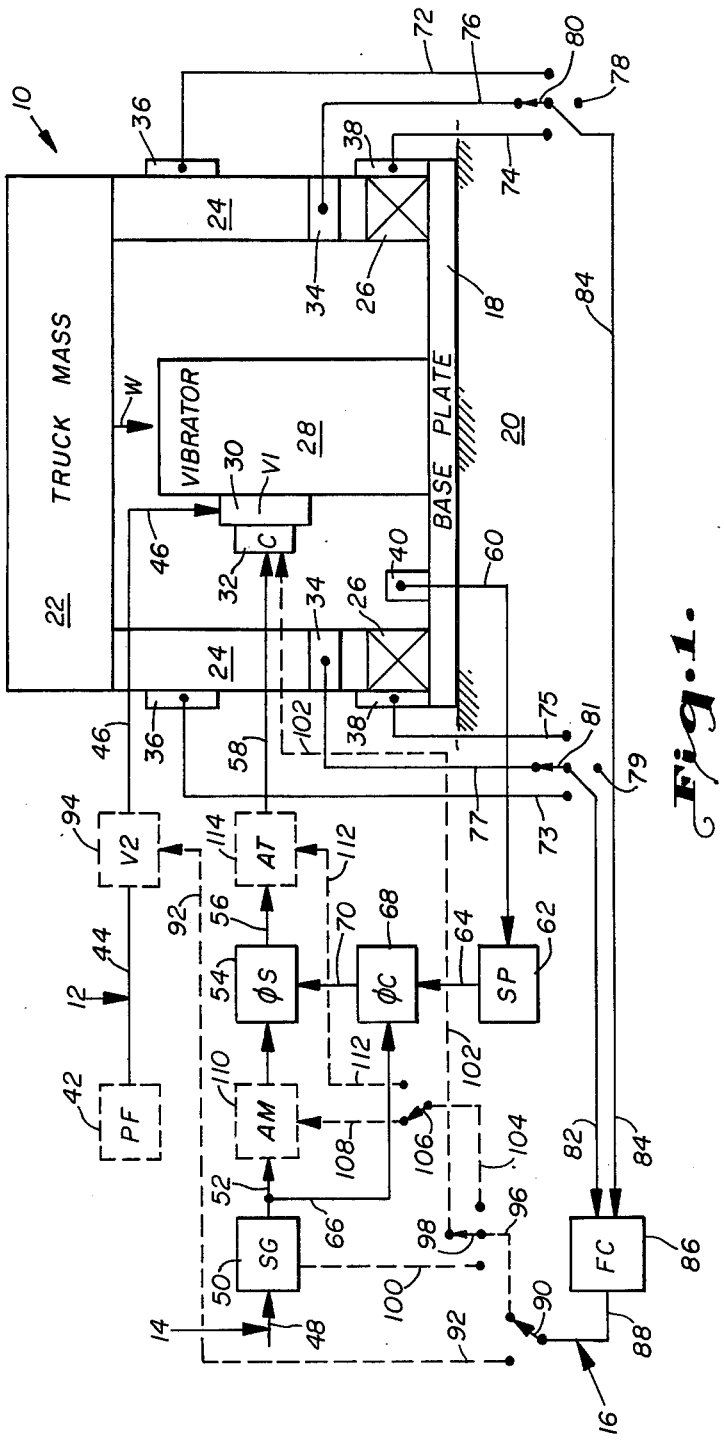
Fig. 1.
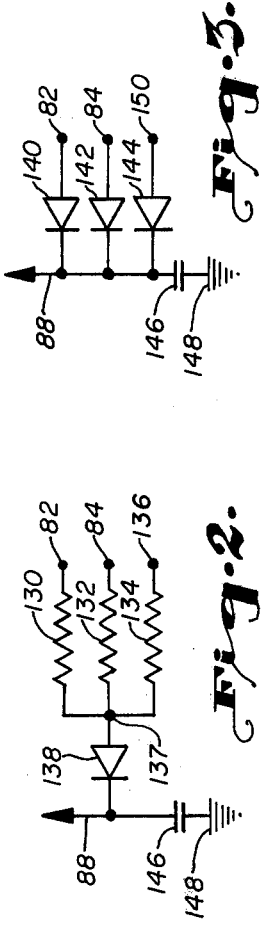
Fig. 2.
Fig. 3.

CONTROL MEANS FOR PRESSURE FLUID VIBRATORS FOR GENERATING SEISMIC WAVES IN THE EARTH

CROSS REFERENCES TO RELATED APPLICATIONS

This application is a continuation-in-part of my copending application Ser. No. 296,669 filed Oct. 11, 1972, entitled: Control Means for Pressure Fluid Vibrators for Generating Seismic Waves in the Earth now U.S. Pat. No. 3,850,090.

It is also related to my U.S. Pat. No. 3,789,951 issued 2/5/74, entitled: Vibrator System for Generating Seismic Waves in the Earth. It is also related to my copending application Ser. No. 296,670 filed 10/11/72 entitled: Vibrator Systems for Generating Elastic Waves in the Earth now U.S. Pat. No. 3,860,087, and Ser. No. 407,646 filed 10/18/73, now U.S.Pat. No. 3,984,805, entitled: Parallel Operation of Seismic Vibrators without Phase Control. U.S. Pat. No. 3,840,090 is entered by reference into the application.

BACKGROUND OF THE INVENTION

This invention is in the general field of large-force reaction type, electro fluid vibrators. More particularly, it is related to vibrators for generating elastic waves in the earth for geophysical purposes. Still more particularly it is concerned with control means to ensure that the vibrator will not provide an alternating force on the earth which is greater than the direct holddown force on the vibrator baseplate in contact with the earth.

In the geophysical industry there are in use large truckmounted electro hydraulic reaction type vibrators. These comprise piston-cylinder systems connected between a baseplate resting on the earth and a large reaction mass. Generally the truck itself, or other vehicle, is used to provide a downwardly direct constant force applied to the baseplate to hold it in contact with the earth. This force is generally applied to the baseplate through a plurality of compliances, which serve to transmit the direct force, while isolating the truck mass from the vibrating baseplate.

If the alternating force generated between the reaction mass (which will be considered to be substantially fixed in space) and the baseplate, is greater than the direct positive force applied by the truck through the compliances to the baseplate, then the baseplate will have intermittent negative forces tending to lift it out of contact with the earth.

This loss of contact is disastrous for two reasons. First, and foremost, it produces a high level of noise and harmonics in the generated seismic waves. Second, it may cause great damage to the vibrator and truck. For these reasons a control means is required to ensure that there will never be a net negative (upwardly directed) force on the baseplate while it is operating.

SUMMARY OF THE INVENTION

It is a principal object of this invention to provide a control means on the electro-fluid vibrator system to prevent a net negative force on the baseplate.

It is a further object of this invention to provide a means to measure the instantaneous holddown force on the baseplate and provide a servo control system responsive to this force, to so control the pressure fluid to prevent a negative force on the baseplate at all times while the vibrator is operating.

It is still further object to provide a peak force measuring system to control the servo system.

These and other objects are realized and the limitations of the prior art are overcome in this invention by the use of a force measuring means in the holddown system. This will register a large direct positive force plus an alternating force corresponding to the alternating force generated by the vibrator. So long as the direct force is larger than the alternating force no control is necessary. However, when the momentary positive force becomes less than a selected minimum, the servo system acts either to reduce the pressure in the high pressure accumulator, or to reduce the rate of flow of fluid injected into the vibrator, so as to reduce the force output of the vibrator.

The holddown force can be applied to the baseplate from the truck frame through columns which are attached to compliances which are attached to the baseplate. Extensometers of the resistive or inductive types can be attached to the columns to measure the instantaneous force transmitted by the columns. The outputs of the extensometers go to a servo system to control the fluid.

Conversely, the instantaneous length of the compliances can be used as a measure of the forces. These lengths can be conveniently measured by inductive sensors, etc. Alternatively, load cells of conventional type can be inserted into the support means to measure the forces.

This invention is a continuation-in-part of application Ser. No. 296,669, now U.S. Pat. No. 3,840,090, which is entered into this application by reference. References is made to that application, which covers the use of a second control system and second value system, which controls the pressure, or the volume rate of flow of pressurized fluid to the first valve system (hydraulic servo valve system) which controls the vibrator.

In this application the second control system controls the first valve system by controlling the maximum value of the sweep electrical signal, which drives the servo valve system. This control is through the use of attenuation in the electrical system, or reduced gain in the sweep generator signal system, or in the phase shift portion of the circuit. This has nothing to do with the phase control, and can be used in conjunction with conventional phase-controlled vibrators, or with non-phase-controlled vibrators (see Ser. No. 407,646, now U.S. Pat. No. 3,984,805).

Since Ser. No. 296,669, now U.S. Pat. No. 3,840,090 controls the pressure fluid system to limit the maximum pressure or maximum rate of flow of pressure fluid, this application adds features to control the electrical drive signal portions of the first control system of the servo-valve.

BRIEF DESCRIPTION OF THE DRAWINGS

These and other objects and advantages of this invention and a better understanding of the principles and details of the invention will be evident from the following description taken in conjunction with the appended drawings, in which:

FIG. 1 shows the pressure fluid system and the electrical signal control system applied to a conventional phase-controlled vibrator system.

FIGS. 2 and 3 show detail of how a plurality of force measuring means can be used to control a vibrator.

DESCRIPTION OF THE PREFERRED EMBODIMENT

Referring now to the drawings, and in particular to FIG. 1, there is shown in schematic form a preferred embodiment of this invention. Numeral 10 indicates generally a conventional vehicle-mounted seismic vibrator system, having a baseplate 18 resting on the earth 20. This is pressed to the earth by the weight of at least a portion of the mass 22 of the truck or other vehicle which carries the vibrator. Downwardly depending columns 24, of which there can be 1, 2, or more, which support the mass 22, are in turn supported on springs or compliances 36 etc. 26 on top of the baseplate 18. The weight W represents the downward force of gravity on the mass 22 pressing on the baseplate 18 against the earth 20.

A vibrator 28 of conventional style rests on, and is rigidly fastened to the baseplate 18. It has an electrohydraulic servo valve system indicated as (V1)30, having electrical controls (C)32. A high pressure fluid system which may be gas or liquid but is preferably liquid, is indicated generally by the numeral 12. The high pressure fluid is provided by a source (PF) (power fluid) or accumulator 42, of conventional design, through conduits 44, 46 to the servo valve, indicated as (V1) (first valve) corresponding to the designation in Ser. No. 296,669 now U.S. Pat. No. 3,840,090. Normally, the pressure of the fluid in PF is controlled to a constant high value of pressure, and the capacity of the source of accumulator 42 is such that this pressure remains substantially constant during operation. However, this pressure may run down as time of operation continues, particularly if the pump (not shown) is of insufficient capacity. The intention, as is well known in the art, is to maintain this high pressure constant, at as high as value as possible to derive the largest possible value of F, the alternating force output, of the vibrator.

Copending application Ser. No. 296,669, now U.S. Pat. No. 3,840,090, is entered as part of this application by reference. FIG. 1 of U.S. Pat. No. 3,840,090 illustrates a vehicle mounted vibrator similar to that of FIG. 1 of this application. It also shows more detail of the vibrator, which is of standard construction, including a piston rod 20 (and 20') attached to the base plate 22. On the piston rod 20 is a piston 18 which reciprocates in a cylinder 16. While the cylinder 16 is shown as part of the mass 14, they can be made as separate pieces and assembled together. In the prior art the mass 14 is variously called a "mass" of a "reaction mass" to distinguish from the "weighting mass" 28 which is normally part of the vehicle, and is used to apply the holddown force W to the baseplate.

The vibrator comprises two parts, the piston 20 and the cylinder 16 reciprocable with respect to each other. Reaction mass (or mass) means 14 is attached to one part, the cylinder 16, and the baseplate means 22 is connected to the other part, the piston 18, through piston rod 20.

So long as the value of W is greater than F, no effort is made to control F. However, if F should become larger than W there is danger that the baseplate 18 will lift off the earth, with resulting poor seismic signal quality and possible damage to the equipment. It therefor becomes important to restrict the restrict the maximum value of F. This can be done by controlling the maximum pressure of, or the rate of flow of, the pressure fluid flowing to V1. This is fully discussed in Ser. No. 296,669 now U.S. Pat. No. 3,840,090. This can also be done by controlling the electrical signal passing to the electrical control system 32 of the servovalve 30, as will be fully described below.

Indicated generally by the numeral 14 is the conventional electrical control system of a conventional phase-controlled vibrator. It comprises a sweep signal generator (SG) 50. This can be a radio system that receives the sweep signal from a distant point over line 48, or an analog or digital storage means such as a magnetic tape, or a digital signal generator plus a digital to analog (D/A) converter. All of this is well known in the art. There is a vibration sensor 40 on the baseplate 18 of the vibrator, which may be an accelerometer or other device which is connected by leads 60 to a signal processor (SP) 62, which can be the conventional integrators in current use. The processed signal from sensor 40 which is a replica of the seismic wave in the earth generated by the vibrator, is compared in the phase comparator ($\phi C$) 68 through lead 64, with the sweep signal generated by SG, over lead 66. The result of the phase comparison in 68 is the phase error signal, which goes by lead 70 to a phase shift circuit ($\phi S$) 54, which shifts the phase of the sweep signal received from SG over lead 52. The shifted phase of the reference sweep provided by SG, now called a drive sweep, goes by leads 56, 58 to the servo valve control 32.

The phase control system is conventional, and any type of phase control system can be used. In fact the non-phase-controlled vibrator described in Ser. No. 407,646, now U.S. Pat. No. 3,984,805 can also be used with the improvements of this invention.

In Ser. No. 296,669, now U.S. Pat. No. 3,840,090 it was shown how the force exerted between the truck 22 and the baseplate 18 through the support means, which includes the column or columns 24 and the springs or compliances 26, could be measured by means of extensometers 36, load cells 34 and/or distance measuring means 38, and other similar devices. Reference is made to Ser. No. 296,699, now U.S. Pat. No. 3,840,090 which is incorporated into this application by reference, for details of these force measuring means.

The force measuring means and the second control means are indicated generally by the numeral 16. Switches 80 or 81 (or more, depending on the number of support means 24, 26) select which of the force measuring means such as the load cell 34, extensometer 36, or the distance measuring means 38 in conjunction with the compliance 26, are to be used to determine when the magnitude of F approaches the magnitude of W. Thus, by switching 80 from lines 72, 74, 76 etc. and switch 81 from lines 73, 75, 77 etc. various force sensors can be used. The signals from the sensors, through switches 80, 81, go through leads 82, 84 etc. to a force signal control (FC) 86, the output of which is on line 88. Switches 80, 81 have an off position 78, 79, respectively so that a single, or multiple sensors can be used.

In Ser. No. 296,669, now U.S. Pat. No. 3,840,090 it was shown how the force control signal from 86 could control the pressure of, and/or the flow rate of the pressure fluid from 42 of means of a second valve (V2) 94 in series with the PF accumulator 42. This is shown by the switch 90 and dashed line 92 going to V2.

This application is directed to applying the corrective signal from the force signal control FC to valve V1, the existing valve system of the servo valve 30 of the vibrator.

In the normal operation of electrohydraulic vibrators an electrical sweep signal is sent to the control portion of the servo valve. Accurate phase control of the vibrator is provided so that the phase of the seismic wave generated in the earth will be in phase with the sweep signal provided by the sweep generator. However, no control is placed on the amplitude of the electrical signal in terms of whether the magnitude of the holddown force is greater than or less than the force generated by the vibrator.

It is possible to control the maximum flow rate of pressure fluid through the servo valve 30 by control of the amplitude of the electrical signal supplied to the servovalve. In this application, the control signal provided by the force measuring means serves to change the maximum amplitude of the electrical sweep signal provided to the servo valve.

There are several ways of doing this. One is to change the amplification in the signal circuit, such as in the amplifier (AM) 110. Another is to provide variable attenuation in the signal circuit, such as in the attenuator (AT) 114. Another is to introduce the control signal from the force control 86 into existing circuit elements, such as the signal generator 50, or the control 32 of the servo valve 30, of the vibrator 28.

The outputs of the force sensor, or sensors 34, 36, 38, through switch or switches 80, 81 go through leads 82, 84 to the force signal control (FC) 86. Here they can converted to a control signal which is a selected function of the force (or forces) in the support means 24. The force control signal goes by way of lead 88 to switch 90. Here the control signal can go to the second valve V2, as is described in Ser. No. 296,669, now U.S. Pat. No. 3,840,090.

Alternatively, the control signal from FC goes to switch 98. Here it can be selectively applied through leads 100 to the signal generator 50 to control the peak amplitude of the sweep signal on lead 52. Or it can go by way of leads 102 to the electrical control 32 of the servo valve V1.

The control signal on switch 98 can also go via leads 104 to switch 106, where it can control series amplifier AM via lead 108, or control series attenuator AT over leads 112.

Referring now to FIGS, 2,3, the force signal control 86 accepts analog signals over leads 82, 84 from one or more force sensors 34, 36, 38 etc. Either one or more sensors can be used simultaneously, one in each of the support means. This is fully discussed in Ser. No. 296,699, now U.S. Pat. No. 3,840,090.

If there is only one sensor, the control 86 can only operate in relation to the voltage provided by that one sensor. However, if there are more than one sensor, the control 86 can operate in two ways: (a) in terms of the average force signal of all sensors, or (b) in terms of maximum force signal of the sensor which shows the largest value of F.

In FIG. 2 is shown a plurality of terminals 82, 84, 136 etc. each connected to a different force sensor. All terminals are connected through equal high resistances 138, 132, 134 etc to a common terminal 137. This network serves to average all of the signals at the junction 137.

The combination of the diode 138 and the capacitor 148 connected to ground is to provide a voltage on lead 88, which is a function of the peak value of the voltage at 137. This voltage on lead 88 is now a function of the peak value of the average value of F on the plurality of sensors.

It will be clear that if only one force sensor is used, and its signal is supplied on lead 82, then the voltage on lead 88 will be a function of the peak value of that one signal.

If it is desired to control the vibrator force output in terms of the peak value of the larges force sensor signal, the circuit of FIG. 3 is used. Now the signal on lead 88 will be a function of the peak value of the largest amplitude of signal applied to terminals 82, 84 150.

The signal on lead 88 increases in amplitude as the force output of the vibrator increases. As this voltage approaches a selected value, the electrical signal applied to the servo valve 30 must be reduced. As indicated above, this can be done by decreasing the gain, and reducing the signal output of the signal generator 50 through lead 100, or the gain of the servo valve control 32 can be reduced. This can be done by appropriate changes in bias voltage or changes in impedance networks across portions of the circuit. Since these devices are commercial units, no specific details of how this can be done is given, since it would depend on the specific circuitry. However, the basic means for using electrical voltage to change the gain of amplifiers, or to change impedance of circuit elements is well known, and is covered in many text books. In its simplest form such control might be by relay, responsive to the control voltage, to apply or remove shunts across portions of circuit elements, etc.

Instead of applying the control voltage on lead 88 to existing circuit elements such as the sweep generator 50, or the servo valve control 32, the control voltage can be applied to amplifier 110, or attenuator 114 inserted in series between the sweep generator 50 and the control 32. The control of amplifier gain, or circuit attenuation by applied voltages is well known in the art and need not be described further.

It will be clear that any known type of force sensors can be used to measure the force in the support means 24, 26. Also, any type of vibrator control can be used, whether phase-controlled or not. Also, the generation of a control signal at 88 can be by the circuits of FIGS. 2,3 or by other well known means, so long as the signal on lead 88 is a function of the sensor signal suitable for measuring the value of F. Also, any type of vibrator can be used, in which the amplitude of the vibrator can be controlled by an electrical signal. This includes among other, explosively driven vibrators. Of course, the preferred type of vibrator is the conventional electrohydraulic vibrator.

While the invention has been described with a certain degree of particularly, it is manifest than many changes may be made in the details of construction and the arrangement of components. It is understood that the invention is not to be limited to the specific language used or the specific embodiments set forth herein by way of exemplifying the invention, but the invention is to be limited only by the scope of the attached claim or claims including the full range of equivalency to which each element or step thereof is entitled.

I claim:

1. In a vibrator system, including vibrator means comprising two parts reciprocable with respect to each other, reaction mass means connected to one part and base plate means connected to the other part, high pressure fluid accumulator means for supplying high pressure fluid, and first valve means and first control means to repetitively inject said high pressure fluid into said vibrator means, said vibrator means generating a pulsating force output of magnitude F, and weighting means pressing with a steady force W on said baseplate means, through at least one support means, said at least one support means including at least one compliance;

the improvement in means to control the magnitude of the force output of said vibrating means, so that the peak value of the force output F of said vibrator means will always be less than the force W applied by said weighting means, comprising;

a. force measuring means in said at least one support means responsive to the force applied between said weighting means and said baseplate means; and b. second control means responsive to said force measuring means for controlling said first valve means to limit the maximum value of said force output F.

2. The improvement as in claim 1 in which said means to limit the maximum value of said force output F comprises means for controlling said first valve means to limit the maximum rate of flow of pressure fluid to said vibrator.

3. The improvement as in claim 1 in which said second control means includes means to control the maximum amplitude of the electrical control signal applied to said first valve means.

4. The improvement as in claim 3 in which said means to control said amplitude includes means in series with said first valve means to attenuate said electrical control signal applied to said first valve means.

5. The improvement as in claim 3 in which said means to control said amplitude includes means to reduce the signal gain through said first valve control means.

6. The improvement as in claim 1 in which said force measuring means comprises said at least one compliance connected between said weighting means and said baseplate means, and dimension measuring means connected between the two ends of said at least one compliance.

7. The improvement as in claim 1 in which said force measuring means comprises load cell means in said at least one support means, said second control means responsive to said load cell means.

8. The improvement as in claim 1 including a plurality of force measuring means connected in parallel between said weighting means and said baseplate means, said second control means responsive to a function of the outputs of said plurality of force measuring means.

9. The improvement as in claim 8 in which said function of the outputs comprises the average value of said plurality of outputs of said plurality of force measuring means.

10. The improvement as in claim 8 in which said function of the outputs comprises the maximum value of said plurality of outputs of said plurality of force measuring means.

11. The apparatus as in claim 1 in which said force measuring means comprises first extensometer means, such as strain gage means, for measuring the compression in said at least one support means, said second control means responsive to said first extensometer means.

12. The apparatus as in claim 6 in which said dimension measuring means comprises inductive means.

* * * * *